United States Patent [19]
Specht et al.

[11] Patent Number: 5,984,348
[45] Date of Patent: Nov. 16, 1999

[54] DEVICE FOR PROTECTING AGAINST A SIDE IMPACT IN A MOTOR VEHICLE

[75] Inventors: Martin Specht, Feldafing; Rudolf Meyer, Odelzhausen, both of Germany

[73] Assignee: Breed Automotive Technology, Inc., Lakeland, Fla.

[21] Appl. No.: 09/094,161

[22] Filed: Jun. 9, 1998

[30] Foreign Application Priority Data

Jun. 13, 1997 [DE] Germany ............................ 197 25 122

[51] Int. Cl.⁶ .................................................. B60R 21/22
[52] U.S. Cl. .................... 280/730.2; 280/740; 280/730.1
[58] Field of Search .............................. 280/728.1, 730.2, 280/730.1, 728.2, 743.1, 729, 740

[56] References Cited

U.S. PATENT DOCUMENTS

| | | | |
|---|---|---|---|
| 5,316,336 | 5/1994 | Taguchi et al. | 280/730 |
| 5,431,435 | 7/1995 | Wilson | 280/728.3 |
| 5,542,695 | 8/1996 | Hanson | 280/729 |
| 5,722,685 | 3/1998 | Eyrainer | 280/730.2 |
| 5,752,713 | 5/1998 | Matsuura et al. | 280/730.2 |
| 5,865,462 | 2/1999 | Robins et al. | 280/730.2 |
| 5,884,937 | 3/1999 | Yamada | 280/730.2 |
| 5,899,489 | 5/1999 | Jost | 280/730.2 |

FOREIGN PATENT DOCUMENTS 4304152  8/1993  Germany ................................ 21/20

*Primary Examiner*—Christopher P. Ellis
*Assistant Examiner*—Lynda Jasmin
*Attorney, Agent, or Firm*—L. Drayer; B. Vrioni

[57] ABSTRACT

A device for protecting against a side impact in a motor vehicle has a gas cushion which in the undeployed state is arranged in the trim of a vehicle door and in the inflated state extends beyond the lower edge of the window of the door, whereby the gas cushion is supported by at least two inflatable supports on the vehicle door which extend beyond the lower edge of the window of the door.

16 Claims, 8 Drawing Sheets

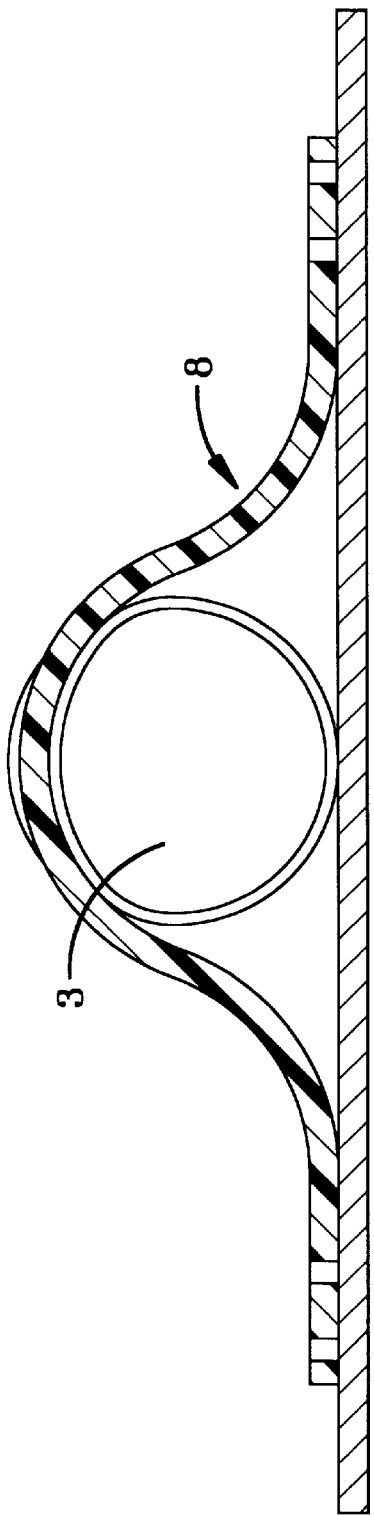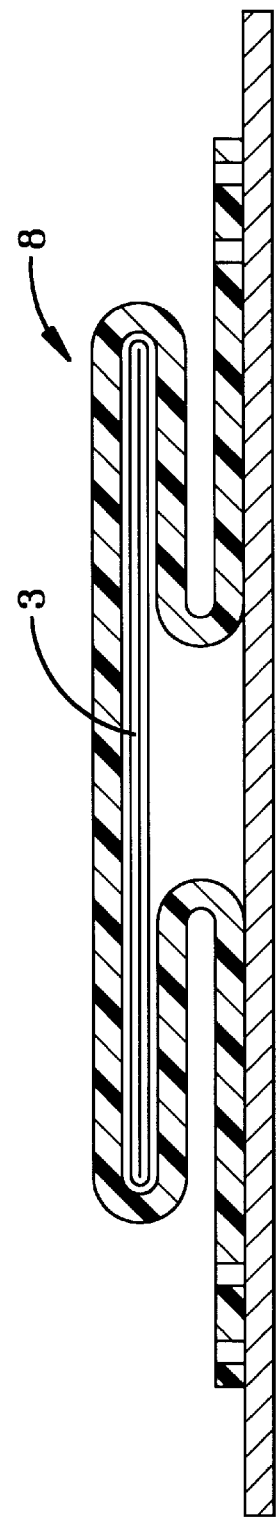

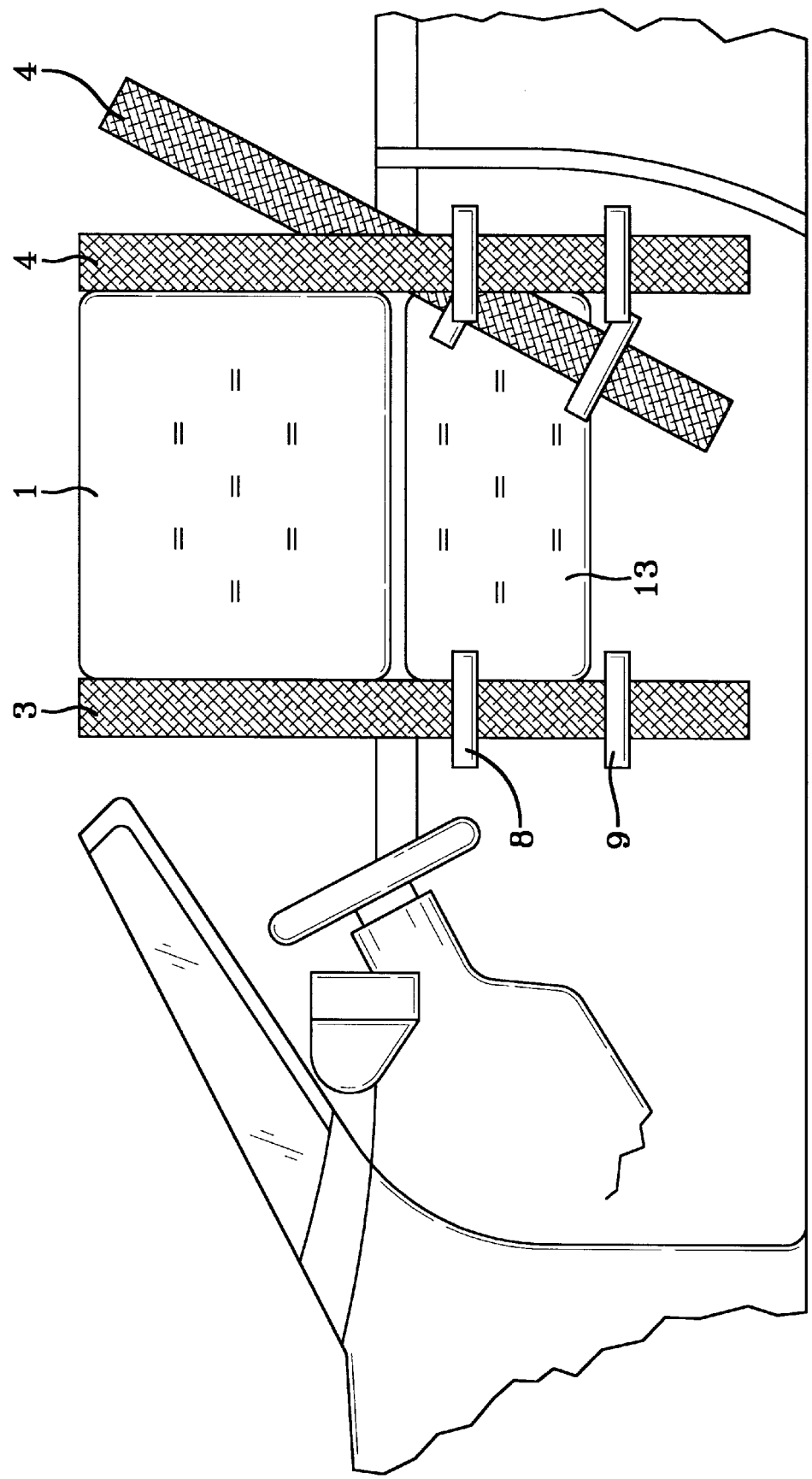

DEVICE FOR PROTECTING AGAINST A SIDE IMPACT IN A MOTOR VEHICLE

The present invention relates to a device for protecting against a side impact in a motor vehicle having an inflatable gas cushion which in the undeployed state is arranged in the trim of a vehicle door and in the inflated state extends laterally in the vehicle beyond the lower edge of a window.

Such a protection device is known from DE 43 04 152 A1. To support the inflated gas cushion projecting beyond the lower edge of the window in the known protection device, there is provided an upper airbag which is fastened to the upper edge of the window. The mutual contact of the two airbags or gas cushions produces a connection of limited transverse strength. Such a transversely resistant connection can be achieved only in closed motor vehicles. In a convertible it is not possible to provide an upper airbag at the upper edge of the window to support the lower airbag.

The object of the invention is therefore to provide a protection device of the type mentioned above in which support for the inflated gas cushion projecting beyond the lower edge of the window or the door is achieved without great expense. This object is achieved according to the invention in that the gas cushion is supported by at least two inflatable supports on the vehicle door which upon inflation extend beyond the lower edge of the window. The gas cushion extends laterally in the vehicle in the inflated state and projects beyond the lower edge of the window and may, preferably, extend substantially over the entire side window. The at least two supports may be of essentially columnar shape in the inflated state. The at least two supports include pressure spaces which give a supporting function to the gas cushion, deployed upon inflation of the two supports, for the filling of the gas cushion with an inflation gas and further during a specific deployment duration (e.g. at least six seconds), during which the gas cushion performs a protective function protecting against a side impact, in particular in the region of the lower edge of the window in the door. In a convertible, this deployment duration is about eight seconds. The deployment duration is to be calculated in particular such that protection is ensured by the gas cushion even in the event of a second impact.

The at least two supports are advantageously arranged inside the gas cushion. This results in a self-supporting airbag which acts as a means of side-impact protection, in particular for a head impact against the lower edge of the window of the door.

In the undeployed, that is to say uninflated, state, the respective supports are arranged in particular in a rolled-up or folded state inside the trim of the vehicle door. The gas cushion may also be arranged in a rolled-up or folded state in the trim. Only small masses have to be moved to obtain the supporting function through the inflation and simultaneous deployment of the gas cushion, whereby the desired supporting and protective functions are achieved in a short time, if necessary within milliseconds.

The respective supports are preferably of hose-like form and in the undeployed, that is to say uninflated, state are accommodated in a collapsed and rolled-up state inside the trim. The hose ends are pressure-sealed. The supports are preferably formed from a gas-tight material. A gas-tight coated fabric particularly suitable for this purpose is that used for example in fire hoses. Such a material can withstand an internal pressure of about $60 \times 10^5$ Pa (60 bar). To produce the supporting action, therefore, a considerably higher pressure is formed in the supports than in the interior of the gas cushion, in which a pressure of about $0.3 \times 10^5$ Pa (0.3 bar) is formed. A gas generator may be used to produce the pressure in the supports. At least one gas generator is preferably provided in each support to produce the supporting pressure space. Each support thus forms a closed pressure system. A separate gas generator or a plurality of separate gas generators may be provided to fill the gas cushion (airbag). These gas generators may preferably be arranged at upper ends in separate chambers of the columnar supports.

BRIEF DESCRIPTION OF THE DRAWINGS

The invention is explained in more detail with reference to the figures, in which:

FIG. 4 shows an embodiment of a fastening means for fastening a support to a vehicle door in the undeployed state and in the inflated state;

FIG. 7 shows a further exemplary embodiment of the invention;

DETAILED DESCRIPTION OF THE INVENTION

Figure 1:
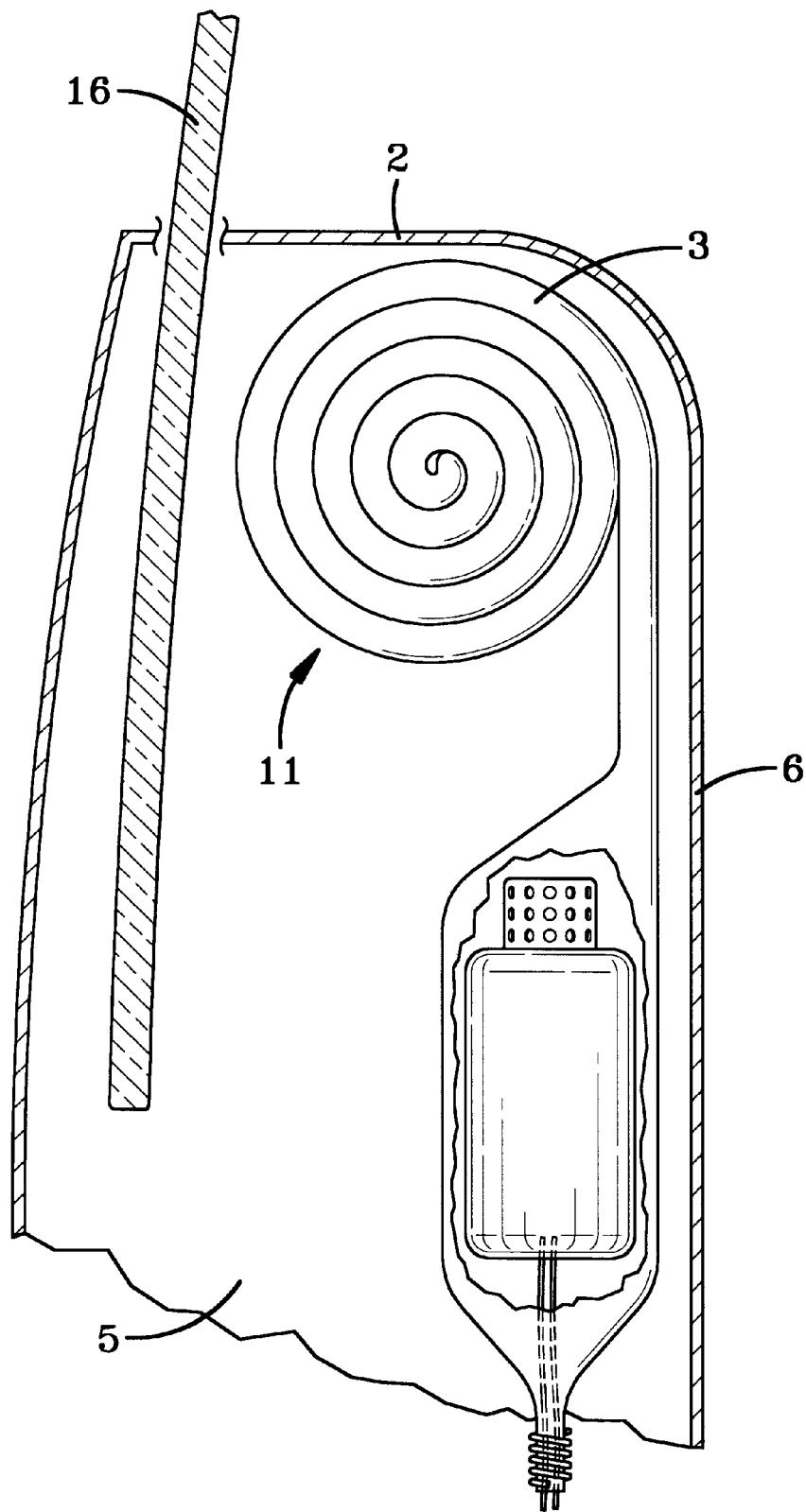
FIG. 1 shows an exemplary embodiment in the undeployed state.
Figure 2A:
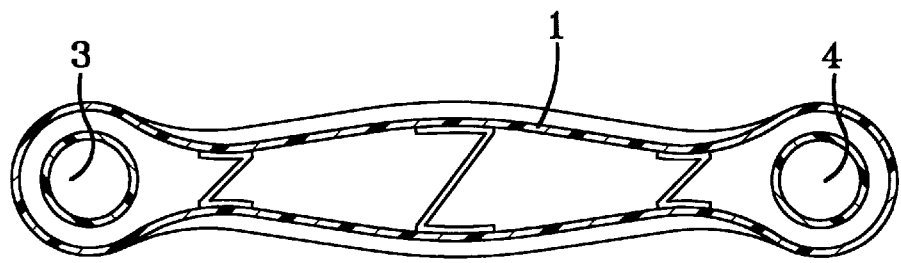
FIG. 2 shows various shapes of gas cushions with built-in supports.
Figure 2B:
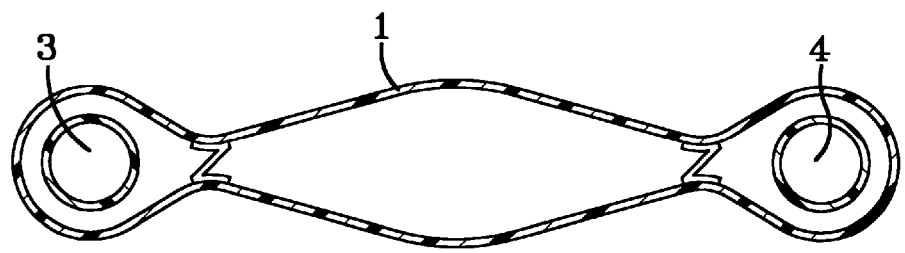
Figure 2C:
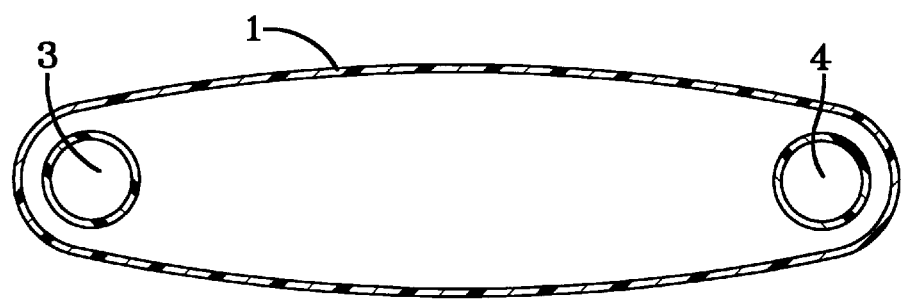
Figure 2D:
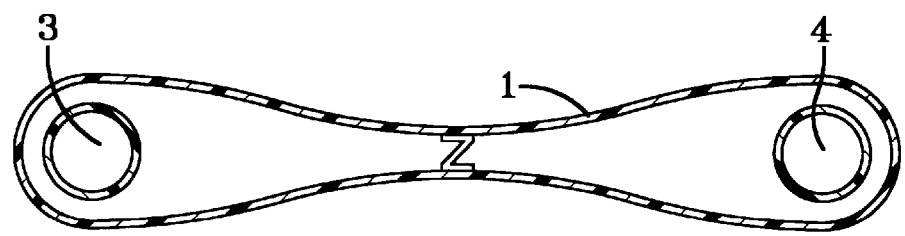
Figure 3:
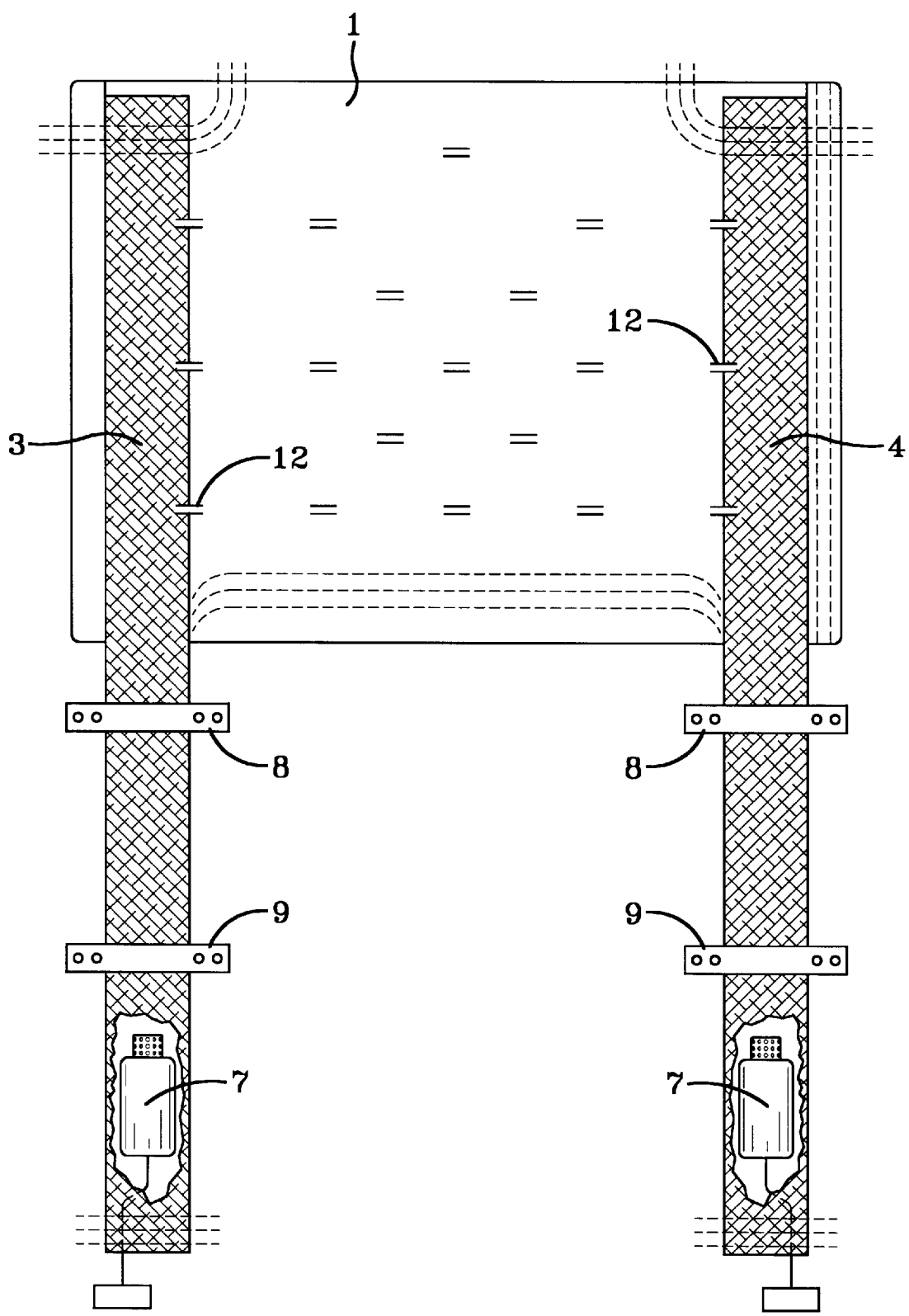
FIG. 3 shows an exemplary embodiment of the protection device in the inflated state.

The protection device shown in the figures possesses two supports 3 and 4 which have a columnar shape in the inflated state (FIG. 3). In the undeployed state the supports 3, 4 are rolled up into a roll 11 (FIG. 1) and accommodated inside the trim 6 of a vehicle door 5. Gas generators 7 are associated with the columnar supports 3 and 4 and serve to inflate them. The gas generators are arranged in the interior of the supports 3 and 4. In the exemplary embodiment illustrated, the supports 3 and 4 are formed from a gas-tight material, in particular a gas-impervious coated fabric. Such a fabric is customarily used for example in fire hoses. In the rolled-up state, each respective hose 3 and 4 forming the support is collapsed and rolled up compactly into the roll illustrated in FIG. 1. The roll 11 lies on the outside, as shown in FIG. 1. Upon unrolling, there is therefore no risk of the deploying roll projecting into the vehicle interior. Injuries to vehicle occupants during the inflation process are thereby avoided. Gas generators 7 are ignited in order that the rolled-up supports 3 and 4 change from the rolled-up state to the inflated state (FIG. 3). This gives rise to a high pressure of up to $30 \times 10^5$ Pa (30 bar) in the inflated supports 3 and 4. As can be seen in particular from FIGS. 2 and 3, the supports 3 and 4 are arranged at both ends inside a gas cushion 1 (airbag). In the undeployed state the gas cushion 1 may also be accommodated in rolled-up form, similarly to the two supports 3, 4, inside the trim of the vehicle door 5. In the exemplary embodiment illustrated, two supports are provided. More supports may be provided, if necessary. The supports 3, 4 and/or the gas cushion 1 may also be folded, for example in a concertina shape, in the undeployed state.

By means of the columnar supports, which are formed by the hoses in the inflated state, a mechanical supporting means for the gas cushion 1 in the deployed state and upon deployment is ensured. Furthermore, the supports 3 and 4 form a supporting framework in the filled state of the gas cushion 1. A significantly lower filling pressure, about $0.3 \times 10^5$ Pa (0.3 bar), is present in the gas cushion 1. In order to produce this filling pressure, the high-pressure spaces in the interior of the hose-like supports 3, 4 may serve as energy stores for filling and replenishing the gas cushion 1 during the required deployment duration, which is about 8 seconds in a convertible. Inflation ports 12, directed into the interior of the gas cushion and having a defined valve action, may be provided in the two supports 3, 4, for example at each respective inwardly directed hose edge. Through these holes, inflation gas which escapes through the permeable fabric of the gas cushion is replenished from the gas stores of the supports 3 and 4 which have a high internal pressure.

For this purpose, the gas generators 7 can generate gas successively in time. A plurality of successively ignited gas generators for filling the supports 3 and 4 and also the gas cushion 1 may also be provided. The supports 3 and 4 preferably form sealed-off pressure systems. For this purpose, the hose-like supports are closed in a gas-tight manner at their upper and lower ends, for example by vulcanization or by sewing. The gas cushion 1 extends beyond the lower edge of the window of the door 2 between the vehicle interior and a window pane 16 and forms a means of side-impact protection, in particular in the head region. It is also possible for the gas cushion to extend downwards between the vehicle door and the seating position of the vehicle occupant.

Figure 5:
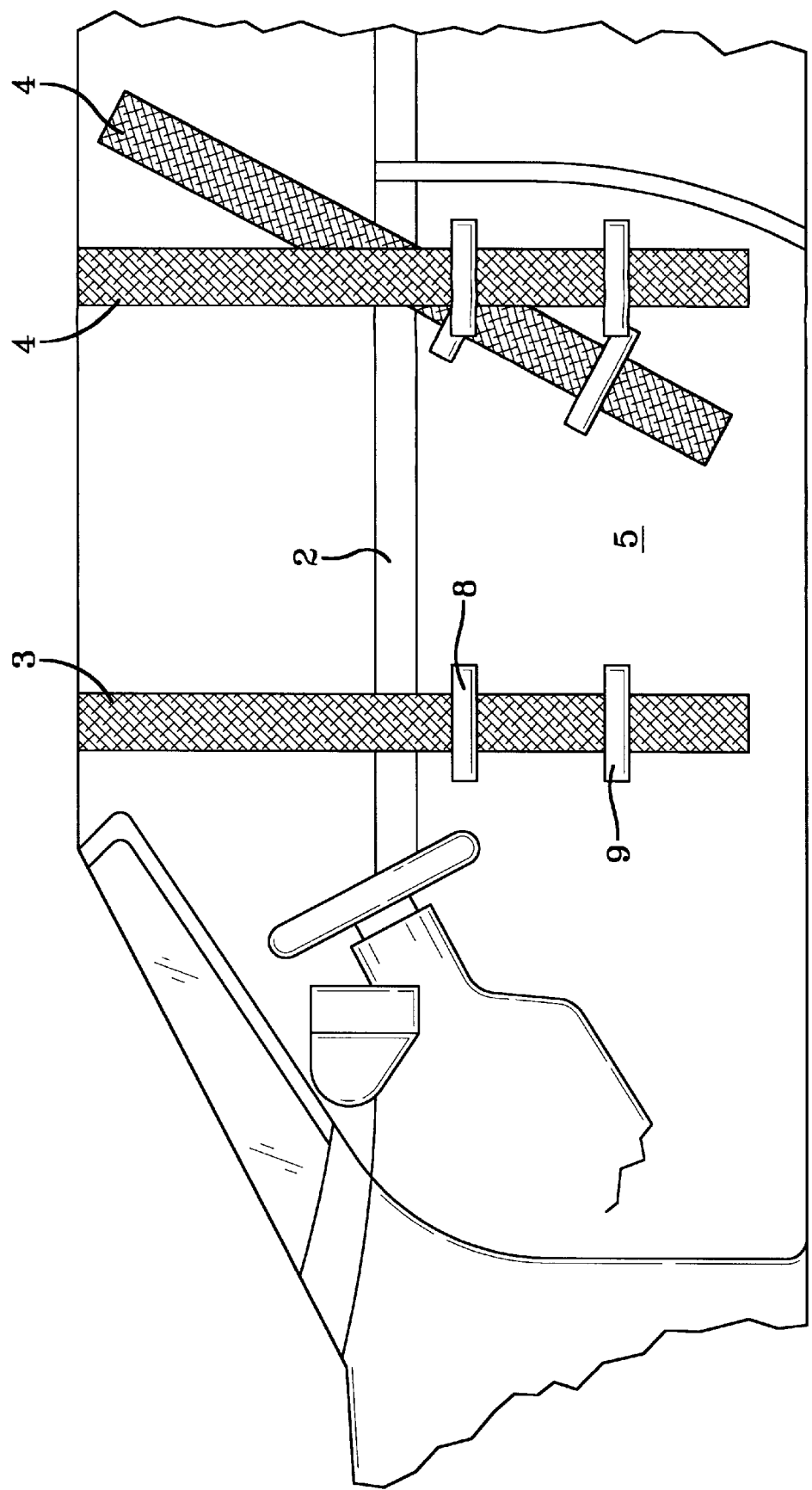
FIG. 5 shows an arrangement of the exemplary embodiment on a vehicle door.

Various shapes of the gas cushion with supports 3 inserted at the ends of the gas cushion are illustrated in FIG. 2 in the representations (A to D). In FIG. 3 the supports 3, 4 extend vertically upwards as supporting columns. It is also possible, however, for one or more supports to run obliquely upwards in the inflated state, as illustrated in FIG. 5.

Figure 6:
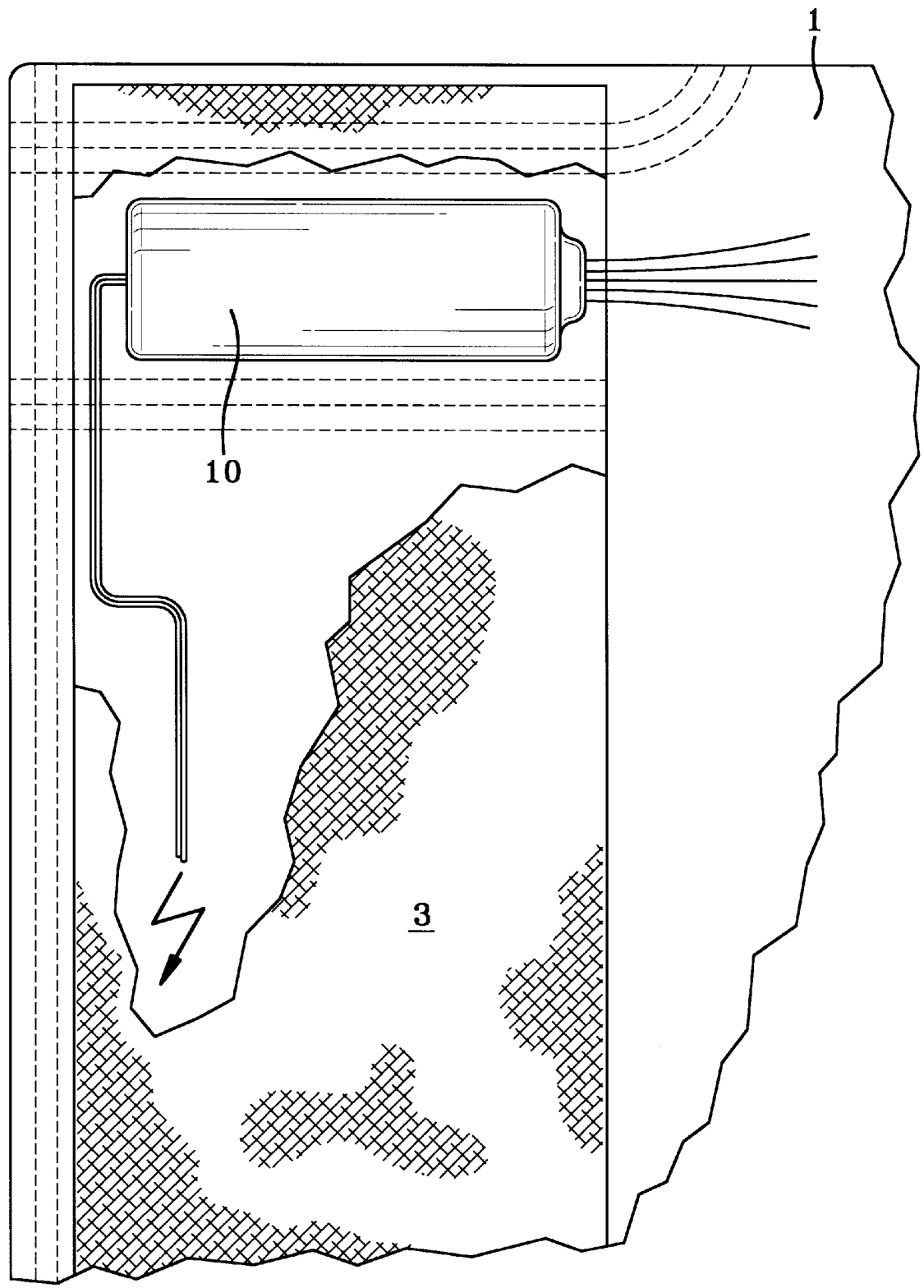
FIG. 6 shows an arrangement of a gas generator for filling the gas cushion.

In the exemplary embodiment illustrated in FIG. 6, a separate gas generator 10 for filling the gas cushion 1 is shown in a separate part of the columnar support 3. Such a gas generator, which serves for filling the gas cushion 1, may also be provided in the other support 4. In this exemplary embodiment, the inner spaces of the columnar supports 3, 4 in the inflated state form pressure-sealed pressure spaces which have a considerably higher internal pressure (approximately a hundred times greater) than the inflation pressure of the gas cushion 1. Both in the exemplary embodiment of FIG. 2 and the embodiment of FIG. 5 the supports 3, 4 form a rigid framework for the gas cushion 1 stretched therebetween. Even if the window pane is destroyed, the gas cushion 1 is prevented from being drawn outwards. The two supports 3, 4 act as rigid columns. To anchor the supports 3 and 4 in their lower region, i.e. in the region running along the vehicle door 5, there are two fastening points 8 and 9, by which the supports are fastened to the vehicle door 5. As can be seen from FIG. 4, the fastening points 8 and 9 are preferably formed by clamps. These clamps may be made of a tape material which is firmly connected to the vehicle door and in the undeployed state is folded, as shown in the representation (A) in FIG. 4. The tape-like material of the clamps is laid around the respective supports. When the supports 3 and 4 are inflated, the tape material of the clamps is expanded, as shown in the representation (B) of FIG. 4. The tape-like clamps provided at various points, in particular at the two fastening points 8 and 9, form a support, on the vehicle door 5, for the inflated supports 3 and 4, formed from the hoses (FIGS. 2 and 5).

As shown in FIG. 7, a further gas cushion 13 may be provided in the thorax region, in particular along the vehicle door. This gas cushion 13 may be a separate gas cushion or a gas cushion connected to gas cushion 1. Gas cushion 1 and/or gas cushion 13 and also the supports 3 and 4 may be filled via gas supply lines. The gas may be generated by a central gas generator or by separate gas generators associated with the respective gas cushions 1 and 13 and the supports 3 and 4. When there is an additional gas cushion 13 (thorax cushion) formed on gas cushion 1, this gas cushion 13, upon filling, may be deployed downwards from gas cushion 1 which is stretched between supports 3 and 4.

Figure 8:
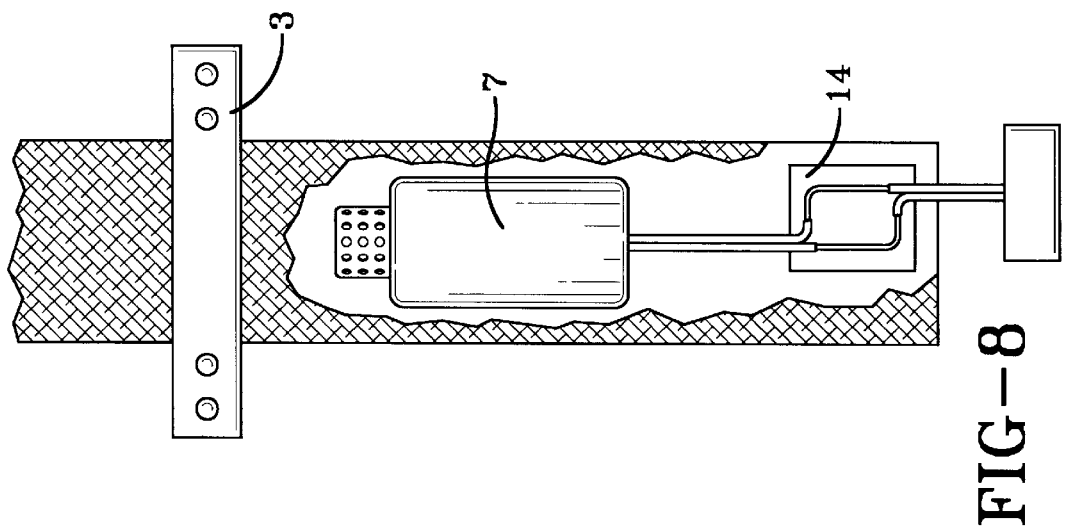
FIG. 8 shows an exemplary embodiment for the pressure-sealed supply of a two-pole ignition cable for the ignition device of a gas generator arranged in the support interior.

As shown in FIG. 8, a sewing zone 14 may be integrated into the ignition cable, which may be designed as a two-pole ignition cable. This enables the respective supports 3 and 4, which may be designed as high-pressure hoses, to be sewn together in a pressure-sealing manner. This sewing zone 14 may be situated in a double or triple sewing region at the lower end of the respective supports 3 and 4.

Figure 9:
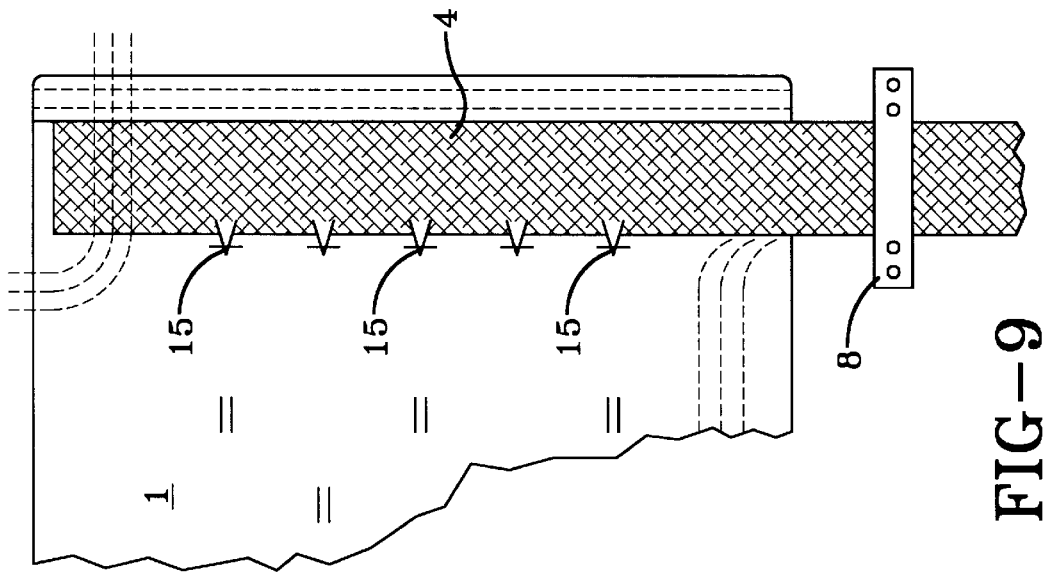
FIG. 9 shows an exemplary embodiment in which the gas cushion is filled via blow-off valves in the supports.

In the exemplary embodiment illustrated in FIG. 9, when a defined overpressure e.g. $30 \times 10^5$ Pa (30 bar) is reached, blow-off valves 15, situated in the hose edge, allow filling gas to be blown from the respective inner spaces of supports 3 and 4 into the gas cushion 1. Thus, firstly, the supporting action required by the supports 3 and 4 is produced in the pressure spaces at the two ends of the supports 3 and 4, whereby the gas cushion 1 is stretched between the two supports and whereby the additional gas cushion 13 (thorax gas cushion), if present, formed onto the gas cushion 1 for deployment downwards into the door region, is kept in readiness. As soon as the defined overpressure is established in the inner spaces of the supports 3, 4, the gas cushion 1 and, if present, the thorax gas cushion 13 formed thereon, are filled via the blow-off valves 15.

In the exemplary embodiments shown, the protection device is described in connection with the front doors of a motor vehicle, in particular a convertible. The protection device may also be arranged on the two rear doors of a motor vehicle or a convertible as a means of side-impact protection.

We claim:

1. A device for protecting against a side impact in a motor vehicle comprising a gas cushion which in the uninflated state is arranged in a trim of a vehicle door and in the inflated state extends laterally in the vehicle and beyond a lower edge of the window of the door, characterized in that the gas cushion is supportable on the vehicle door by at least two respective inflatable supports which upon inflation extend beyond the lower edge of the window of the door and wherein the respective inflatable supports are supported on the vehicle door at fastening points in the region in which the supports extend along the vehicle door.

2. The device for protecting against a side impact in a motor vehicle described in claim 1, characterized in that the at least two supports are of essentially columnar shape in the inflated state.

3. The device for protecting against a side impact in a motor vehicle described in claim 2 wherein each of the at least two supports is formed by a hose which is collapsed in the undeployed state.

4. The device for protecting against a side impact in a motor vehicle described in claim 3 wherein the at least two supports are arranged in the interior of the gas cushion.

5. The device for protecting against a side impact in a motor vehicle described in claim 4 wherein a substantially higher filling pressure prevails in the supports than in the gas cushion.

6. The device for protecting against a side impact in a motor vehicle described in claim 4 wherein a substantially higher filling pressure prevails in the supports than in the gas cushion.

7. The device for protecting against a side impact in a motor vehicle described in claim 4 further comprising a thorax gas cushion.

8. The device for protecting against a side impact in a motor vehicle described in claim 2 wherein the at least two supports are arranged in the interior of the gas cushion.

9. The device for protecting against a side impact in a motor vehicle described in claim 2 wherein a substantially higher filling pressure prevails in the supports than in the gas cushion.

10. The device for protecting against a side impact in a motor vehicle described in claim 2 wherein a gas pressure space constructed in the supports form a gas store for replenishing the gas cushion during deployment.

11. The device for protecting against a side impact in a motor vehicle described in claim 2 further comprising a thorax gas cushion.

12. The device for protecting against a side impact in a motor vehicle described in claim 1 wherein each of the at least two supports is formed by a hose which is collapsed in the undeployed state.

13. The device for protecting against a side impact in a motor vehicle described in claim 1 wherein the at least two supports are arranged in the interior of the gas cushion.

14. The device for protecting against a side impact in a motor vehicle described in claim 1 wherein a substantially higher filling pressure prevails in the supports than in the gas cushion.

15. The device for protecting against a side impact in a motor vehicle described in claim 1 wherein a gas pressure space constructed in the supports form a gas store for replenishing the gas cushion during deployment.

16. The device for protecting against a side impact in a motor vehicle described in claim 1 further comprising a thorax gas cushion.

* * * * *